United States Patent
McCorkendale et al.

(10) Patent No.: US 8,849,922 B1
(45) Date of Patent: Sep. 30, 2014

(54) METHOD AND APPARATUS FOR AGGREGATING NOTICES AND ALERTS INTO AN AGGREGATE MACHINE READABLE FEED

(75) Inventors: Bruce McCorkendale, Manhattan Beach, CA (US); Shaun Cooley, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 1171 days.

(21) Appl. No.: 11/864,873

(22) Filed: Sep. 28, 2007

(51) Int. Cl.
*G06F 15/16* (2006.01)

(52) U.S. Cl.
USPC .............................. 709/206; 709/224; 726/27

(58) Field of Classification Search
USPC .............................. 709/206, 224, 200; 726/27
See application file for complete search history.

(56) References Cited

U.S. PATENT DOCUMENTS

| | | | |
|---|---|---|---|
| 7,617,190 B2 * | 11/2009 | Wright et al. | 707/3 |
| 2004/0009772 A1 * | 1/2004 | Mazzara, Jr. | 455/436 |
| 2007/0094156 A1 * | 4/2007 | Isaacs | 706/2 |
| 2007/0100959 A1 * | 5/2007 | Eichstaedt et al. | 709/217 |
| 2007/0143502 A1 * | 6/2007 | Garcia-Martin et al. | 709/246 |
| 2007/0282959 A1 * | 12/2007 | Stern | 709/206 |
| 2007/0282973 A1 * | 12/2007 | Chapman et al. | 709/217 |
| 2007/0282993 A1 * | 12/2007 | McMillan et al. | 709/223 |
| 2008/0168503 A1 * | 7/2008 | Sparrell | 725/58 |
| 2008/0320139 A1 * | 12/2008 | Fukuda et al. | 709/226 |
| 2009/0042549 A1 * | 2/2009 | Lee | 455/414.4 |

* cited by examiner

*Primary Examiner* — El Hadji Sall
(74) *Attorney, Agent, or Firm* — Wilmer Cutler Pickering Hale and Dorr LLP

(57) ABSTRACT

A method and apparatus for aggregating notices and alerts (alerts) into an aggregate machine readable feed wherein the alerts are retrieved from various information sources. One embodiment of the invention is a method and apparatus providing an alert via an aggregate machine readable feed, comprising receiving an alert from various information sources, converting the retrieved alert into an aggregate machine readable format, and placing the aggregate machine readable formatted alert into an aggregate machine readable feed.

13 Claims, 3 Drawing Sheets

METHOD AND APPARATUS FOR AGGREGATING NOTICES AND ALERTS INTO AN AGGREGATE MACHINE READABLE FEED

BACKGROUND OF THE INVENTION

1. Field of the Invention

Embodiments of the present invention generally relate to network computing and, more particularly, to a method and apparatus for aggregating notices and alerts (hereinafter referred to as alerts) into an aggregate machine readable feed.

2. Description of the Related Art

In today's environment, users of computers, mobile phones, or other such devices are provided information from a variety of sources. Those information sources include SMS alerts, email notifications, and information from special alert areas on web sites. Examples of the type information include a user receiving billing notices, newly vested stock options, updates concerning frequent flyer miles, and the like. When arriving as emails, the information may be lost in a sea of other emails. Tracking and screening this heavy influx of information is compounded by the fact that important notifications may occur on special areas of web sites such as online brokerage, bank, credit card, or frequent flier sites. In many instances, users have to remember to log into the various web sites to check for important alerts requiring action (frequently, a user can configure such sites to send alerts as emails). Hence, users have to sort through the vastly varying contexts from email to email taking note of important alerts while fending off spam. Obviously, there can be significant consequences if a user does not pay a bill, miss an opportunity to sell newly vested stock options, or lose expiring frequent flier rewards. Such oversights could easily occur without an efficient method of screening the information that users deal with on a daily basis.

Therefore, there is a need in the art for an efficient method and apparatus for aggregating notices and alerts that a user receives from various information sources and supplying the notices and alerts as an aggregate machine readable feed.

SUMMARY OF THE INVENTION

Embodiments of the present invention comprise a method and apparatus for aggregating notices and alerts (hereinafter referred to as alerts) into an aggregate machine readable feed wherein the alerts are retrieved from various information sources. One embodiment of the invention is a method and apparatus for providing an alert via an aggregate machine readable feed, comprising receiving an alert from various information sources, converting the retrieved alert into an aggregate machine readable format, and placing the aggregate machine readable formatted alert into an aggregate machine readable feed.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. Further, the word "a" means at least one.

DETAILED DESCRIPTION

Figure 1:
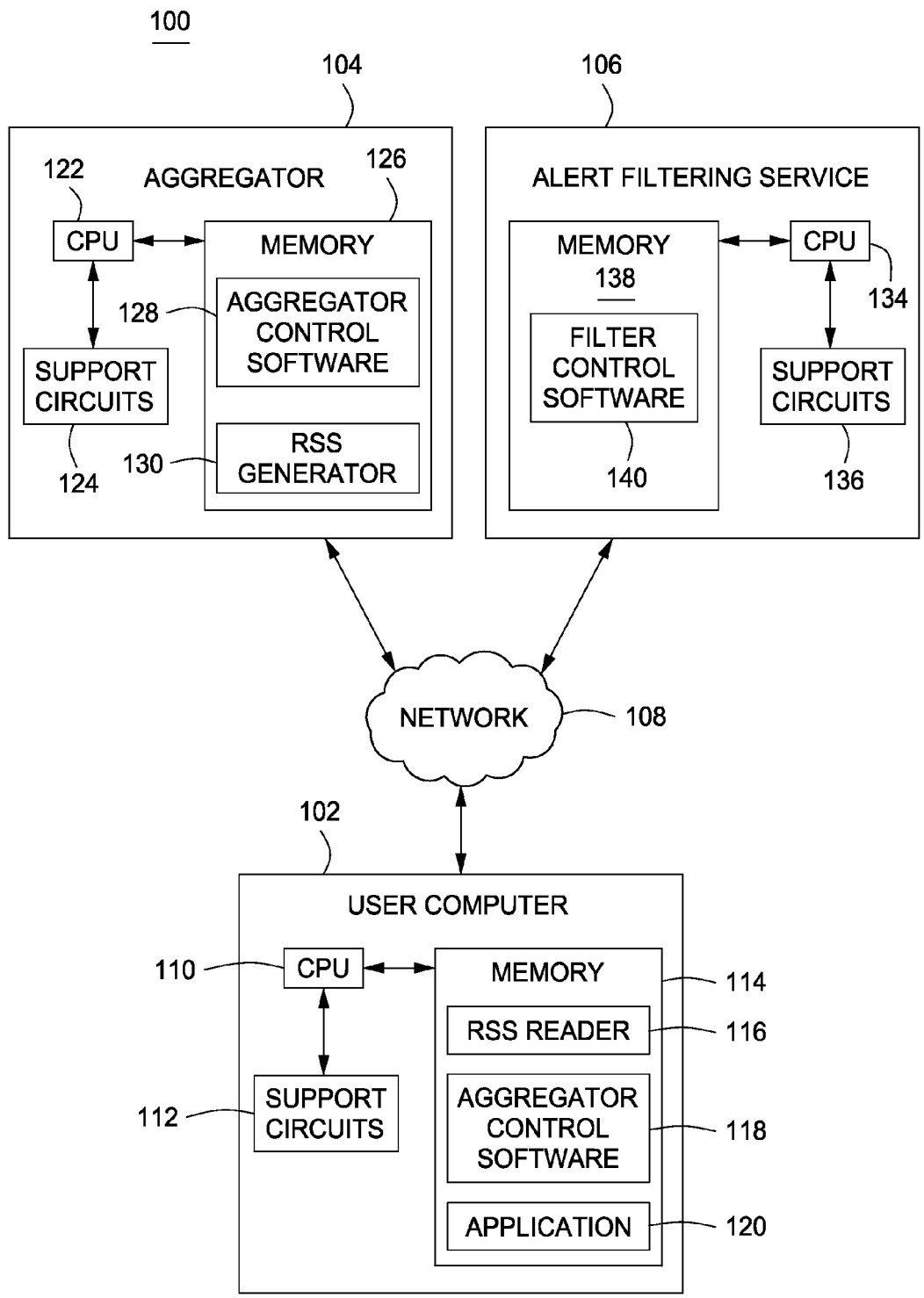
FIG. 1 is a block diagram of a computer system according to various embodiments of the present invention.

FIG. 1 is a block diagram of a computer system 100 according to various embodiments of the present invention. The computer system 100 comprises a user computer 102, an aggregator 104, and an alert filtering service 106 running several applications and connected to a network 108 that generally forms a portion of the Internet which may comprise various sub-networks such as Ethernet networks, local area networks, wide area networks, wireless networks, and the like. Those skilled in the art will appreciate that the hardware depicted in the FIG. 1 may vary from one computer system to another. For example, other peripheral devices, such as optical disk drives, graphics card, data storage devices, various other input devices, peripherals and the like, may also be used in addition to or in place of the hardware depicted. The network 108 provides access to user computer 102 for various applications located on the aggregator 104 and the alert filtering service 106. Although the aggregator 104 and alert filtering service 106 are depicted and described as executing upon separate computers, alternatively, a single computer may be used to support both the aggregator and the alert filtering service.

The aggregator 104 comprises, without limitation, a central processing unit (CPU) 122, support circuits 124, and a memory 126. The CPU 122 may be one or more of any commercially available microprocessors or microcontrollers. The support circuits 124 comprise circuits and devices that are used in support of the operation of the CPU 122. Such support circuits include, for example, one or more of cache, input/output circuits, system bus, PCI bus, clock circuits, power supplies or the like. The memory 126 may comprise random access memory, read only memory, optical memory, disk drives, removable memory, and the like. Various types of software processes or modules and information are resident within the memory 126. For example, various processes such as an Operating System (OS) kernel (not shown), a software library (not shown), and software modules, for example, aggregator control module 128, and aggregate machine readable generator module 130 are illustrated as being resident in the memory 126. The aggregator control software module 128 facilitates filtering of alerts that are retrieved from various information sources (e.g., SMS, emails, or in special areas on specific web sites). Unwanted alerts (i.e., alerts the do not meet user filter criteria) may be discarded at the source. The aggregate machine readable feed generator module 130 places the filtered alerts into aggregate machine readable format for easy access and viewing by the user. Aggregate machine readable is a family of web feed formats typically used to publish frequently updated content such as blog entries, news headlines or podcasts. One embodiment of an aggregate machine readable feed is a Really Simple Syndication (RSS) feed.

There are a number of methods that could enable a centralized alert aggregation service such as aggregator 104 to find and retrieve the alerts. For email, SMS, and the like, the centralized alert aggregation service may make special alert addresses available to users. The users configure third party services that provide such alerts with the addresses provided by the centralized alert aggregation service rather than using their ordinary alert addresses. The centralized alert aggregation service, when given credentials for such third party sites, automatically log into third part alerts sites and configure the alerts with the special addresses. An alternative embodiment of the present invention involves having agents (e.g., alert filtering service 106) filter a user's email and SMS to find various alerts for inclusion in the aggregation service.

The alert filtering service 106 comprises, without limitation, a CPU 134, support circuits 136, and a memory 138. Although the CPU 134 may be one or more of any commercially available microprocessors or microcontrollers. The support circuits 136 comprise circuits and devices that are used in support of the operation of the CPU 134. Such support circuits include, for example, one or more of cache, input/output circuits, system bus, PCI bus, clock circuits, power supplies or the like. The memory 138 may comprise random access memory, read only memory, optical memory, disk drives, removable memory, and the like. Various types of software processes or modules or information are resident within the memory 138. For example, various processes such as an Operating System (OS) kernel (not shown), a software library (not shown), and software modules, e.g., filter control software module 140, are illustrated as being resident in the memory 138. In one embodiment of the present invention, the alert filtering service may be used to filter user's email and SMS alerts for inclusion in the aggregation service. Accordingly, the filter control software module 140 may be used to facilitate the filtering of such alerts.

The user computer 102 comprises, also without limitation, a CPU 110, support circuits 112, and a memory 114. The CPU 110 may be one or more of any commercially available microprocessors or microcontrollers. The support circuits 112 comprise circuits and devices that are used in support of the operation of the CPU 110 Such support circuits include, for example, one or more of cache, input/output circuits, system bus, PCI bus, clock circuits, power supplies or the like. The memory 114 may comprise random access memory, read only memory, optical memory, disk drives, removable memory, and the like. Various types of software processes or modules and information are resident within the memory 108. For example, various processes such as an Operating System (OS) kernel (not shown), a software library (not shown), and software modules, for example, an aggregate machine readable feed reader module 116, an aggregator control software module 118, and an application module 120, are illustrated as being resident in the memory 114.

The aggregator control software module 118 may be employed by the user of the user computer 102 facilitates the configuration of third party services that provide alerts with special addresses provided by a centralized alert aggregation service rather than using their ordinary alert addresses.

The aggregate machine readable feed reader module 116 may be any software utility that allows aggregate machine readable feed viewing (e.g., Google aggregate machine readable feed popup/toaster, Outlook aggregate machine readable feed viewer, or any home page configuration that allow aggregate machine readable feeds).

The application module 120 may be any software application of interest to the user of user computer 102.

Figure 2:
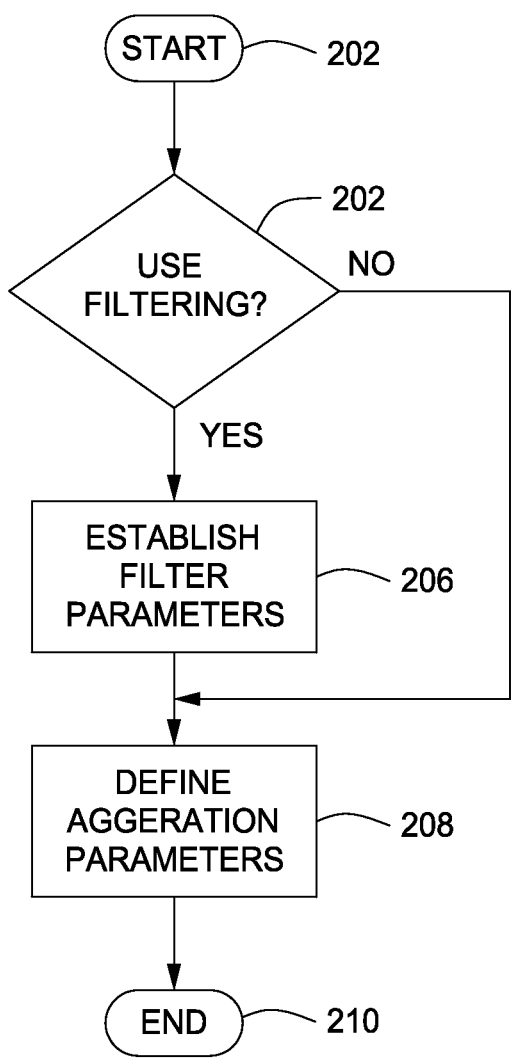
FIG. 2 is a flow chart of a method for establishing aggregation and filtering parameters for alerts to be included in an aggregate machine readable feed according to an embodiment of the present invention.

FIG. 2 depicts a flow diagram of a method of operation for establishing filter parameters and aggregation control parameters in accordance with one embodiment of the present invention. The user may establish the parameters locally and send them to the aggregator and/or the alert filtering service, or the user may interact directly with the aggregator and/or filtering service via a Web portal. The method 200 begins at step 202 and proceeds to step 204, wherein the user decides whether filtering is to be used in processing the alert. If the user decides that filtering is to be used, the query at step 204 is affirmatively answered and the method 200 proceeds to step 206. At step 206 the user establishes filter parameters for collecting and filtering the alerts. These parameters are communicated to the alert filtering software.

If the query at step 204 is negatively answered, the method 200 proceeds from 204 to step 208. At step 208 the user defines the aggregation control parameters that will establish which alerts are collected to be used within an aggregate machine readable feed. The method 200 ends at step 210. In the manner, the user through an interface on the user computer can establish the filter parameters and the aggregation control parameters for aggregating the alerts into an aggregate machine readable feed. Once established the filter parameters are communicated to the filter hardware and the aggregation control parameters are communicated to the aggregator.

Figure 3:
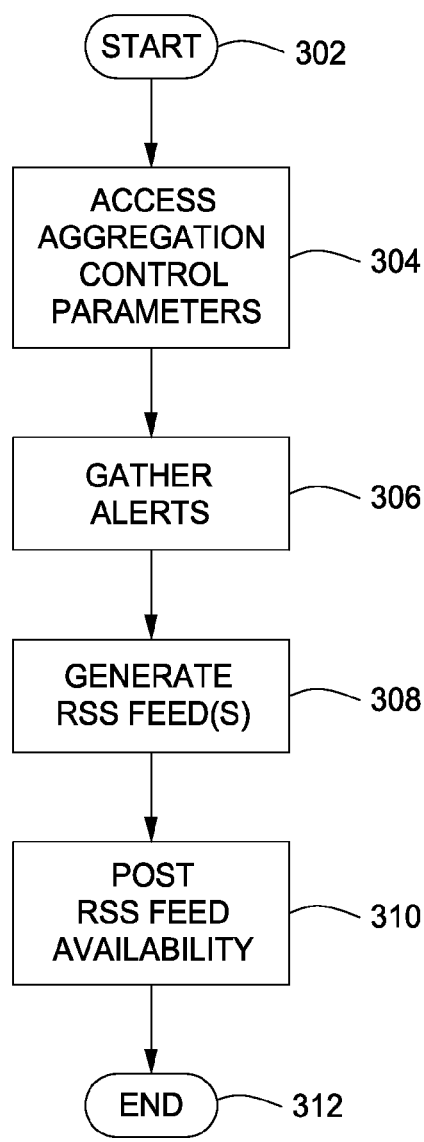
FIG. 3 is a flow diagram of a method of operation for the aggregator in accordance with one embodiment of the invention.

FIG. 3 depicts a flow diagram of a method of operation of the aggregator in accordance with the present invention. The method 300 begins at step 302 and proceeds to step 304, wherein the method 300 accesses the aggregation control parameters. At step 306 the aggregator gathers the alerts in accordance with the aggregation control parameters. At step 308 the alerts, which are generally stored in memory, are arranged in an aggregate machine readable format to create an aggregate machine readable feed. In some instances, a user may, through the aggregation control parameters define multiple aggregate machine readable feeds are to be generated for various types of alerts. At step 310, the aggregate machine readable feed or feeds are posted for access through a Web portal such that they are made available for access by a user. The method 300 ends at step 312.

Figure 4:
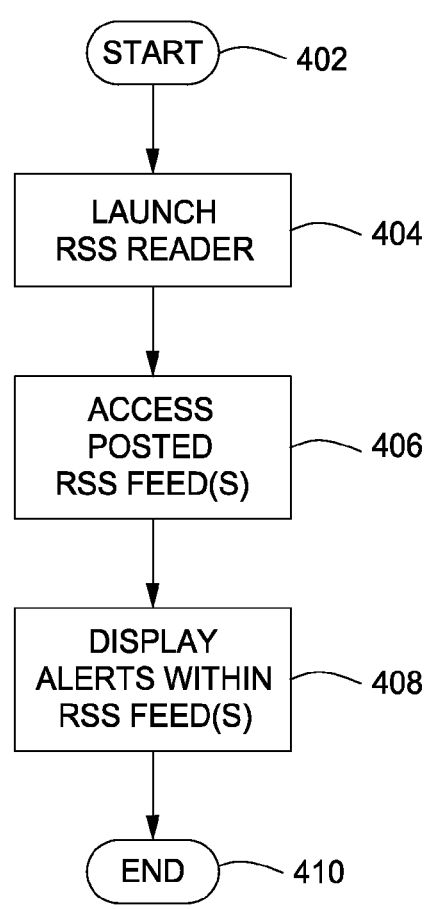
FIG. 4 is a flow diagram of a method of operation of a user computer to receive the aggregate machine readable feed containing the alert in accordance with one embodiment of the invention.

FIG. 4 depicts a flow diagram of a method 400 of operation of a user computer to access and display information within an aggregate machine readable feed. The method 400 begins at step 402 and proceeds to step 404, wherein the method launches an aggregate machine readable reader. At step 406, the aggregate machine readable reader will access the posted aggregate machine readable feed or feeds. At step 408, the alerts that are contained within the aggregate machine readable feed are displayed via the aggregate machine readable reader. At step 410, the method 400 ends.

Using embodiments of the present invention, a user may filter and aggregate a plurality of notices and alerts into at least one aggregate machine readable feed. The aggregate machine readable feed can be accessed by a user's aggregate machine readable reader to provide a continuous feed of their notices and alerts such that such notices and alerts will not be overlooked or misplaced. They can be "read" and "re-read" at anytime by the user.

While the foregoing is directed to embodiments of the present invention, other and further embodiments of the invention may be devised without departing from the basic scope thereof, and the scope thereof is determined by the claims that follow.

What is claimed is:

1. A method of providing an alert via an aggregate machine readable feed, comprising:
   generating a special alert address for alert aggregation, the special alert address being used to configure alerts from a third party service to be aggregated by a centralized aggregation service;
   receiving an alert at the special alert address from various information sources using a computer, wherein the alert is received from at least one of an SMS message, an email, or a website, wherein the alert is filtered by criteria provided by a user, wherein if the alert is unwanted, the alert is discarded at one of the various information sources;
   converting the retrieved alert into an aggregate machine readable format using the computer; and
   placing the aggregate machine readable formatted alert into an aggregate machine readable feed using the computer.

2. The method of claim 1 further comprising:
   accessing and viewing the alert within the aggregate machine readable feed using an aggregate machine readable reader.

3. The method of claim 1 wherein the alert that is filtered is placed in multiple aggregate machine readable feeds.

4. The method of claim 1 wherein the aggregate machine readable feed is a Really Simple Syndication (RSS) feed.

5. A method of providing alerts via an aggregate machine readable feed, comprising:
   generating a special alert address for alert aggregation, the special alert address being used to configure alerts from a third party service to be aggregated by a centralized aggregation service;
   aggregating a plurality of alerts received at the special alert address from a plurality of alert sources using a computer wherein the plurality of alerts is received from at least one of an SMS message, an email, or a website, wherein the alert is filtered by criteria provided by a user, wherein if the alert is unwanted, the alert is discarded at one of the various information sources;
   converting the retrieved alerts into an aggregate machine readable format using a computer; and
   placing the aggregate machine readable formatted alerts into an aggregate machine readable feed using a computer.

6. The method of claim 5 further comprising accessing and viewing the alert within the aggregate machine readable feed with an aggregate machine readable reader.

7. The method of claim 5 wherein the aggregating step further comprises:
   performing at least one of receiving alerts via electronic communications, or receiving alerts through access to third party web sites and extracting the alerts.

8. The method of claim 5 further comprising filtering the alerts prior to aggregating alerts.

9. The method of claim 8 wherein the filtered alerts are place in multiple aggregate machine readable feeds.

10. The method of claim 5 wherein the aggregate machine readable feed is a Really Simple Syndication (RSS) feed.

11. An apparatus for providing alerts through an aggregate machine readable feed comprising:
    an aggregator for generating a special alert address for alert aggregation, the special alert address being used to configure alerts from a third party service to be aggregated by a centralized aggregation service; receiving a plurality of alerts at the special alert address from information sources wherein the plurality of alerts are received from at least one of an SMS message, an email, or a website, the aggregator comprising an aggregate machine readable feed generator for placing the alerts in aggregate machine readable format, wherein the alerts are filtered by criteria provided by a user, wherein if at least one of the alerts is unwanted, the at least one unwanted alert is discarded at one of the various information sources, and creating an aggregate machine readable feed comprising the aggregate machine readable formatted alerts.

12. The apparatus of claim 11 further comprising an alert filtering service for the filtering the plurality of alerts and coupling the filtered plurality of alerts to the aggregator.

13. The apparatus of claim 11 wherein the aggregate machine readable feed is a Really Simple Syndication (RSS) feed.

\* \* \* \* \*